United States Patent
Heatherly et al.

(10) Patent No.: US 7,929,028 B2
(45) Date of Patent: Apr. 19, 2011

(54) METHOD AND SYSTEM FOR FACILITATING CREATION OF CONTENT

(75) Inventors: Christopher Heatherly, Monrovia, CA (US); Sunny Holmes, Redondo Beach, CA (US); Randal Ouye, Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 937 days.

(21) Appl. No.: 11/824,071

(22) Filed: Jun. 28, 2007

(65) Prior Publication Data

US 2009/0003794 A1    Jan. 1, 2009

(51) Int. Cl.
*H04N 5/76* (2006.01)
*H04N 5/222* (2006.01)

(52) U.S. Cl. ................ 348/231.3; 348/333.02

(58) Field of Classification Search ............ 348/231.99, 348/231.1–231.5, 239, 333.01–333.05
See application file for complete search history.

(56) References Cited

U.S. PATENT DOCUMENTS

| 2002/0136531 | A1  | 9/2002 | Harradine |
| 2004/0001079 | A1  | 1/2004 | Zhao |
| 2005/0002648 | A1* | 1/2005 | Hoshino et al. ............... 386/69 |
| 2005/0134707 | A1* | 6/2005 | Perotti et al. ................. 348/239 |
| 2005/0206751 | A1* | 9/2005 | Manico et al. ................ 348/239 |

FOREIGN PATENT DOCUMENTS

| EP | 0871177 | 10/1998 |
| GB | 2380821 | 4/2003 |

* cited by examiner

*Primary Examiner* — Kelly L Jerabek
(74) *Attorney, Agent, or Firm* — Farjami & Farjami LLP

(57) ABSTRACT

There is provided a method for use by a content capturing device for facilitating creation of content. According to one embodiment, the method includes receiving a content project file in a receiver of the content capturing device. The method further includes providing instructions to the user via a user interface for creating one or more portions of the content. In one embodiment, the instructions can be included in the content project file. The content can be, for example, a video or a collection of one or more digital still images. The method further includes capturing the one or more portions of the content using a video module and automatically editing the one or more portions of the content to generate the content.

16 Claims, 3 Drawing Sheets

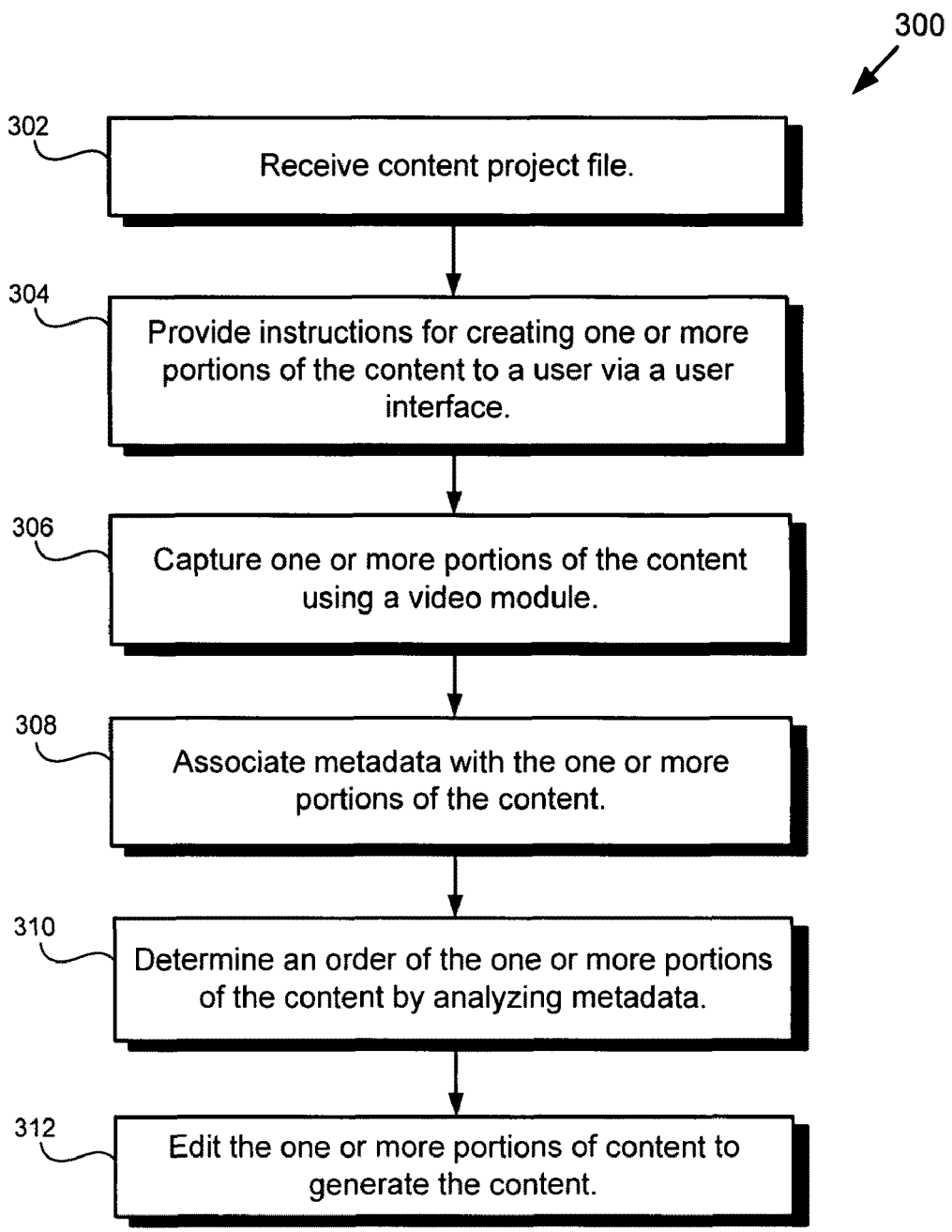

US 7,929,028 B2

METHOD AND SYSTEM FOR FACILITATING CREATION OF CONTENT

BACKGROUND OF THE INVENTION

1. Field of the Invention

The present invention relates generally to techniques for creating content. More particularly, the present invention relates to techniques for capturing and editing video content.

2. Background Art

The rapidly decreasing cost of consumer video cameras and consumer digital cameras has created a number of new markets for manufacturers and distributors. For example, more and more children have been receiving consumer video cameras as gifts. Moreover, it has been found that children typically use these video cameras to re-create their favorite content, such as their favorite movies and television shows, featuring themselves as the stars. As such, it has become important for manufacturers of consumer video cameras to provide features that enable children to create such content with relative ease, in order to stay competitive and to further increase sales of the video cameras.

However, since consumer video cameras are designed to include features targeted only at adult consumers, conventional consumer video cameras typically do not include features that can help children create their own content. As such, children are generally limited to mimicking portions of their favorite content from memory, which can often times be difficult and frustrating. Furthermore, consumer video cameras typically do not provide any features that enable children to easily edit different portions of their content.

SUMMARY OF THE INVENTION

There is provided methods and systems for facilitating creation of content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart for performing a method for facilitating creation of content, in accordance with one embodiment of the invention.

DETAILED DESCRIPTION OF THE INVENTION

Figure 1:
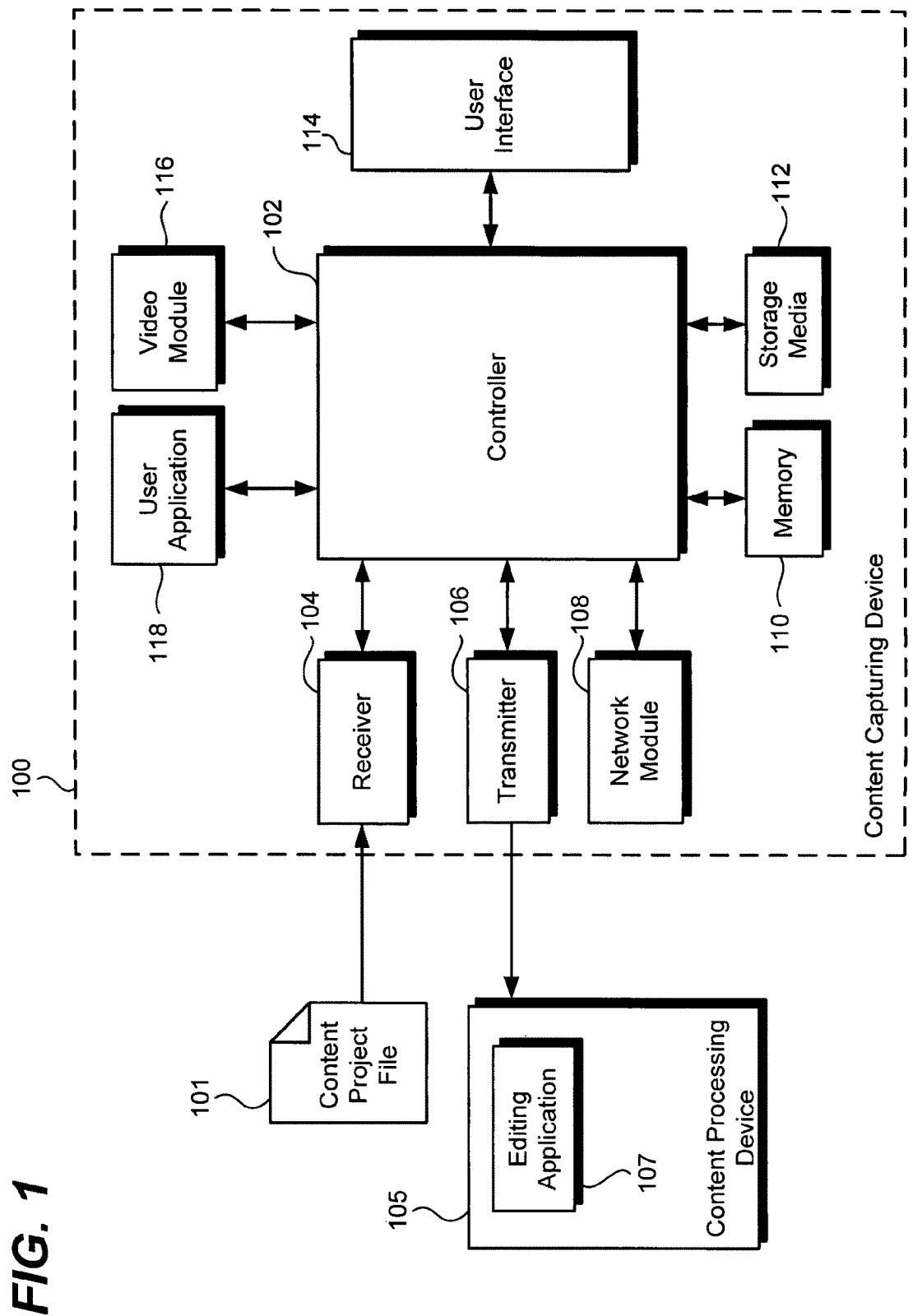
FIG. 1 illustrates a block diagram of a content capturing device for facilitating the creation of content, in accordance with one embodiment of the invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a block diagram of content capturing device 100 for facilitating the creation of content, in accordance with one embodiment of the invention. Content capturing device 100 includes controller 102, receiver 104, transmitter 106, network module 108, memory device 110, storage media 112, user interface 114, video module 116, and user application 118.

In one embodiment, content capturing device 100 can be a consumer video camera or a computing device configured to capture video, such as a cellular telephone equipped with a video camera. In another embodiment, content capturing device 100 can be a consumer digital camera. As shown in FIG. 1, controller 102 is coupled to receiver 104, transmitter 106, network module 108, memory device 110, storage media 112, user interface 114, and video module 116. As also shown in FIG. 1, controller 102 is in communication with user application 118. Controller 102 can be, for example, a microprocessor or a central processing unit ("CPU").

In one embodiment, content capturing device 100 can be configured to receive a user selectable content project file, such as content project file 101, which can include instructions for creating each portion, i.e., each scene, of the content the user has selected to create. The content can be, for example, a movie, a television show, a music video, or a collection of one or more digital still images. In one embodiment, content project file 101 can be a computer file that includes scene-by-scene instructions for re-creating a commercial movie, such as Disney's "Pirates of the Caribbean." In another embodiment, content project file 101 can be a computer file that includes instructions for creating a storyboard of a commercial movie using digital still images.

In the embodiment shown in FIG. 1, content capturing device 100 is configured to receive content project file 101 via receiver 104. In one embodiment, receiver 104 can be a memory card reader, such as a Secure Digital ("SD") card reader or a CompactFlash ("CF") card reader. In such an embodiment, content capturing device 100 can be configured to receive content project file 101 by reading a memory card storing content project file 101. In another embodiment, receiver 104 can be an interface, such as a Universal Serial Bus ("USB") interface, for communicating with a personal computer or any other electronic device. In one embodiment, content capturing device 100 can be configured to receive content project file 101 via network module 108. Network module 108 can be, for example, a Wi-Fi module, a Bluetooth module, an Ethernet adapter, or any other type of network communication device.

In one embodiment, user application 118 in FIG. 1 can be configured to store content project file 101 in memory device 110 of content capturing device 100. User application 118 can be further configured to display the instructions included in content project file 101 through user interface 114. User interface 114 can include, for example, various input devices such as a keyboard, a keypad, and/or a pointing device (e.g., a mouse). User interface 114 can further include various output devices, such as a liquid crystal display ("LCD") and/or an audio speaker.

The instructions in content project file 101 can include, for example, a script and/or stage directions associated with each scene in the content, which can be used to guide a user through the creation of each scene in the content to be created. In one embodiment, user application 118 can be configured to display the instructions for creating a scene through user interface 114. Thus, the instructions can be displayed before and/or during the creation of a scene to conveniently prompt the user with the script and or stage directions associated with the scene. In one embodiment, the instructions can be displayed on an LCD display in user interface 114 using text. In another embodiment, the instructions can be displayed using a video clip, which provides a preview of the events that take place in the scene. In yet another embodiment, the instructions can be displayed using still images arranged in a storyboard format. In still another embodiment, the instructions can be a narration stored as a sound file, which can be output through a speaker in user interface 114. It should be understood that the instructions in content project file 101 can be displayed using various combinations of the abovementioned embodiments without departing from the scope of the invention.

Once the instructions for creating a scene have been displayed, the user can use content capturing device 100 to easily capture the scene in accordance with the instructions. In the embodiment shown in FIG. 1, content capturing device 100 can capture content via video module 116, which can include, for example, a lens and an imager. Thus, in one embodiment, video capture module 116 can be configured to generate a video signal of the content using techniques known in the art, which can then be provided to controller 102 for processing. In such an embodiment, controller 102 can be configured to digitize and compress the video signal using various digital formats known in the art, such as Motion Picture Experts Group ("MPEG"). In another embodiment, video capture module 116 can be configured to generate a digital still image.

User application 118 can be further configured to associate metadata with the content created by the user. In one embodiment, user application 118 can be configured to associate metadata with each scene of the content created by the user. For example, the metadata can include various information about the scene, such as the name of the content (e.g., the name of the movie) in which the scene is to be used, the scene number, and the date and time the scene was created. The metadata can further include information indicating the "take" number of the scene if, for example, more than one take of the same scene is created by the user. In one embodiment, the metadata can be used to indicate if any transitions (e.g., a fade in or fade out effect) are to be inserted before or after the created scene. In one embodiment, the metadata can further include information that indicates whether any special effects should be applied to the scene. For example, the metadata can be used to indicate whether a scene created by the user utilizes a "bluescreen" technique, which can be used to superimpose the subjects appearing in the scene on a predetermined background. As another example, the metadata can be used to indicate whether a scene created by the user utilizes a "motion capture" technique, which can be used to record the movements of the subject appearing in the scene and to apply the movements to, for example, an animated character. In one embodiment, controller 102 can be configured to store each scene (and any associated metadata) created by the user in memory device 110. Memory device 110 can be, for example, a flash memory device or a hard disk.

Figure 2:
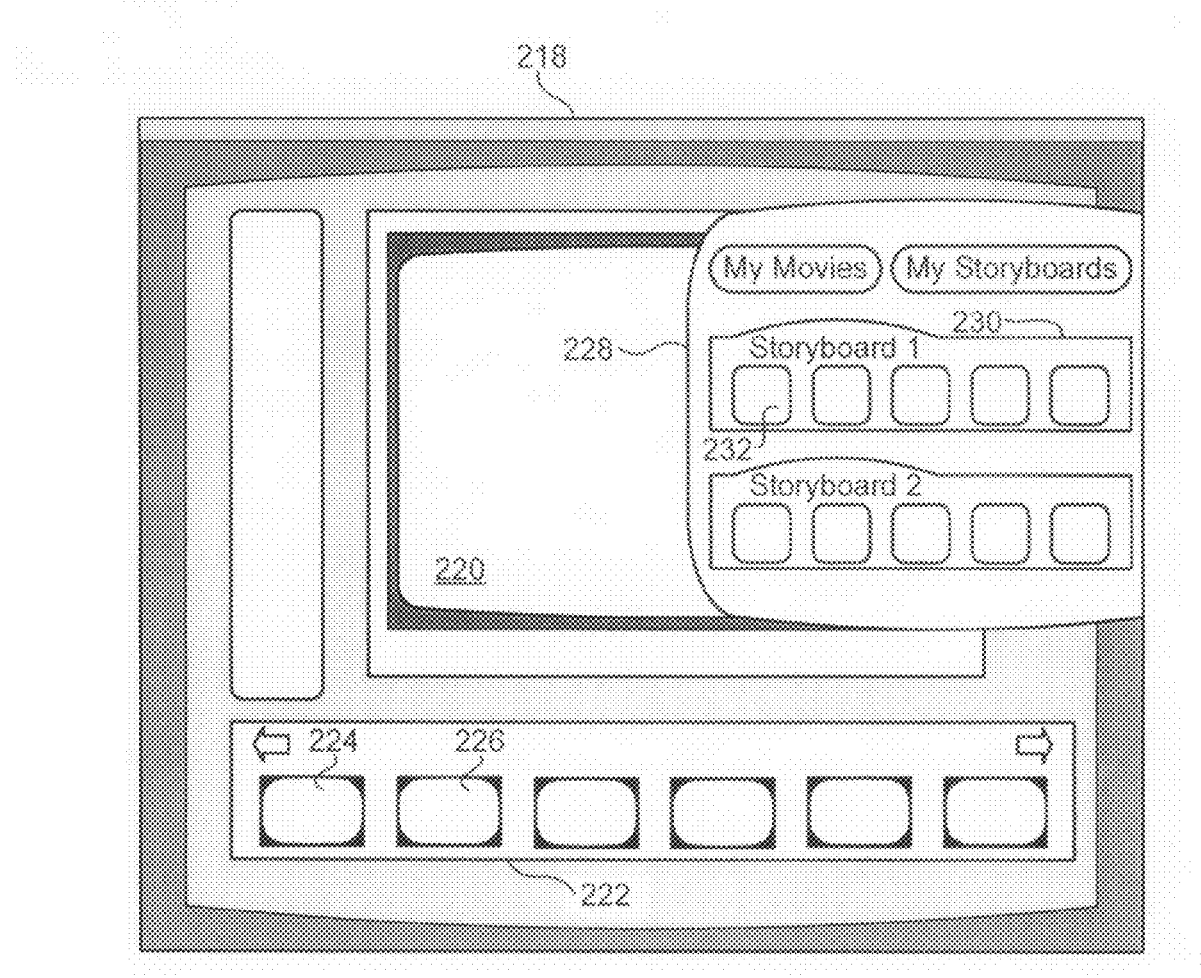
FIG. 2 illustrates the automatic editing features of a content capturing device, in accordance with one embodiment of the invention.

In one embodiment, user application 118 can be configured to automatically perform an editing process on the scenes stored in memory device 110 to generate the content. The editing process of the invention will now be described with reference to FIG. 2. FIG. 2 shows an example operation of the automatic editing features of user application 118 shown in FIG. 1. FIG. 2 includes editing application window 218, which can be for example, a graphical user interface ("GUI") for controlling the abovementioned editing process. As shown in FIG. 2, editing application window 218 includes canvas 220 and frames strip 222. As also shown in FIG. 2, frames strip 222 includes a number of frames, such as frame 224.

In one embodiment, each of the frames in frames strip 222 can be automatically associated with a scene stored in memory device 110 using the metadata attached to each scene. For example, user application 118 can be configured to associate the first frame in frames strip 222, i.e., frame 224, with the first scene in memory device 110, and to associate the second frame in frames strip 222, i.e., frame 226, with the second scene in memory device 110. In one embodiment, the order of the frames in frames strip 222 can be arranged by the user using a drag and drop technique by dragging and dropping one frame before or after another frame. In one embodiment, the frames can be populated with a sample image from an associated scene.

In one embodiment, user application 118 can be configured to apply the appropriate special effects to a scene as indicated by any metadata associated with the scene. For example, if a scene is associated with metadata indicating that the scene utilizes a "bluescreen" technique, user application 118 may superimpose the subject in the scene on a predetermined background included in content project file 101. In another embodiment, a user may manually apply a desired special effect to a scene by selecting the appropriate frame in frames strip 222 associated with the scene and initiating a command through application window 218. In one embodiment, user application 118 can be configured to automatically insert frames in frames strip 224 that are associated with interstitial scenes. The interstitial scenes can be, for example, scenes that may be difficult for a user to create and which provides continuity between the scenes captured by the user, such as a scene overlooking a tropical beach.

As shown in FIG. 2, application window 218 can provide access to content project window 228, which can be used to view content project file 101 as a storyboard, such as storyboard 230. In one embodiment, a user may select a storyboard scene in storyboard 230, such as storyboard scene 232, to initiate display of the instructions associated with the selected storyboard scene in canvas 220.

After generating frames strip 222, user application 118 can combine the scenes associated with the frames in frames strip 222 to generate the content. In one embodiment, controller 102 can be configured to store the content created by the user in storage media 112. In one embodiment, storage media 112 can be an optical disc, such as a Digital Video Disc ("DVD"), a Compact Disc read only memory ("CD-ROM"), or a Blu-ray Disc. In another embodiment, storage media 112 can be a videotape. In other embodiments, storage media 112 can be a flash memory device or a hard disk.

In one embodiment, the automatic editing process of user application 118 described above can be performed by an independent editing application configured to operate in a content processing device. Accordingly, as shown in FIG. 1, content processing device 105 can be configured to receive the scenes stored in memory device 110 from transmitter 106 and to automatically edit the scenes to generate the content as described above. Content processing device 105 can be, for example, a personal computer. Transmitter 106 can be, for example, an interface for communicating with a personal computer or any other electronic device, such as a Universal Serial Bus ("USB") interface. In one embodiment, editing application 107 can be configured to automatically open application window 218 in content processing device 105 upon receiving the abovementioned scenes created by the user. Editing application 107 can be further configured to determine the name of the content in which the scenes are to be used and to automatically arrange the scenes in their proper order in frames strip 222 by analyzing the metadata associated with each scene. Moreover, editing application 107 can be configured to apply the appropriate special effects to each scene as indicated by the metadata associated with each scene. Once the content is generated by content processing device 105, the content can be viewed using content processing device 105 or stored on storage media.

FIG. 3 shows a flowchart for performing method 300 for facilitating the creation of content in accordance with one embodiment of the invention. As shown in FIG. 3 and with reference to FIGS. 1 and 2, at step 302 of flowchart 300, content project file 101 is received by content capturing device 100. At step 304, instructions for creating one or more portions of the content are provided to a user via user interface 114. At step 306, one or more portions of the content are captured using video module 116. At step 308, metadata is associated with the one or more portions of the content. Then at step 310, the order of the one or more portions of the content are determined by analyzing the metadata. Thereafter, at step 312, the one or more portions of the content are automatically edited to generate the content.

Thus, the invention allows a user of a video camera or a digital camera to easily re-create her favorite content, such as a movie or a television show, with ease and with little preparation. Moreover, the automatic editing features of the invention can enable a child to create her own content without having to understand the intricacies of the editing process. Furthermore, the content project files used by the invention can potentially provide users with a vast selection of content to create. In addition to these advantages, since the invention can be implemented in a video camera or digital camera without requiring substantial changes to the hardware of each respective camera, the invention can be conveniently implemented by manufacturers at a low cost.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a content capturing device for facilitating creation of content, said method comprising:
    receiving a content project file, including instructions, in a receiver of said content capturing device;
    providing said instructions to a user via a user interface for creating one or more portions of said content;
    capturing said one or more portions of said content using a video module;
    associating metadata with said one or more portions of said content, said metadata including a scene number for each of said one or more portions of said content, wherein said metadata indicate whether any scene of said one or more portions of said content is created by utilizing a motion capture technique;
    determining an order of said one or more portions of said content using said scene number for each of said one or more portions of said content;
    using said motion capture technique to record movements of a subject appearing in said scene; and
    applying said movements to an animated character.

2. The method of claim 1, wherein said metadata include a take number for each of said one or more portions of said content.

3. The method of claim 1, wherein said metadata include a name of said content, a date, a time, and special effects information.

4. The method of claim 1, wherein said metadata indicate whether any scene of said one or more portions of said content is created by utilizing a bluescreen technique.

5. The method of claim 1 wherein said instructions comprise one of a video clip, a storyboard, a still image, or a narration.

6. The method of claim 1 further comprising editing said one or more portions of said content, wherein said editing includes applying special effects to said one or more portions of said content.

7. The method of claim 1 wherein said content is a re-creation of a movie, a television show, or a music video.

8. The method of claim 1 wherein said one or more portions of said content is a digital still image.

9. A content capturing device for facilitating creation of content, said content capturing device comprising:
    a receiver configured to receive a content project file including instructions;
    a controller configured to:
        provide said instructions to a user via a user interface for creating one or more portions of said content;
        capture said one or more portions of said content using a video module;
        associate metadata with said one or more portions of said content, said metadata including a scene number for each of said one or more portions of said content, wherein said metadata indicate whether any scene of said one or more portions of said content is created by utilizing a motion capture technique;
        determine an order of said one or more portions of said content using said scene number for each of said one or more portions of said content;
        using said motion capture technique to record movements of a subject appearing in said scene; and
        applying said movements to an animated character.

10. The content capturing device of claim 9, wherein said metadata include a take number for each of said one or more portions of said content.

11. The content capturing device of claim 9, wherein said metadata include a name of said content, a date, a time, and special effects information.

12. The content capturing device of claim 9, wherein said metadata indicate whether any scene of said one or more portions of said content is created by utilizing a bluescreen technique.

13. The content capturing device of claim 9, wherein said instructions comprise one of a video clip, a storyboard, a still image, or a narration.

14. The content capturing device of claim 9, wherein said controller is further configured to edit said one or more portions of said content, wherein said editing includes applying special effects to said one or more portions of said content.

15. The content capturing device of claim 9, wherein said content is a re-creation of a movie, a television show, or a music video.

16. The content capturing device of claim 9, wherein said one or more portions of said content is a digital still image.

* * * * *